US006941375B1

(12) United States Patent
Govindarajan et al.

(10) Patent No.: US 6,941,375 B1
(45) Date of Patent: Sep. 6, 2005

(54) FINDING E-SERVICE IN CLIENT-DEFINED, LOOSELY COUPLED, E-SERVICE COMMUNITIES

(75) Inventors: Kannan Govindarajan, Fremont, CA (US); Sekhar R. Sarukkai, Sunnyvale, CA (US); Shamik Sharma, Sunnyvale, CA (US); Shankar Umamaheshwaran, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 09/733,025

(22) Filed: Dec. 8, 2000

(51) Int. Cl.[7] .......................... G08F 15/16; G08F 17/30
(52) U.S. Cl. ............................... 709/229; 707/3; 707/9; 707/10
(58) Field of Search ................................. 709/203, 217, 709/219, 227, 229; 707/3, 4, 5, 6, 9, 10

(56) References Cited

U.S. PATENT DOCUMENTS

| 6,041,326 | A | * | 3/2000 | Amro et al. ................... 707/10 |
| 6,321,227 | B1 | * | 11/2001 | Ryu ............................. 707/10 |
| 6,324,587 | B1 | * | 11/2001 | Trenbeath et al. .......... 719/310 |
| 6,366,926 | B1 | * | 4/2002 | Pohlmann et al. ........ 707/104.1 |
| 6,401,118 | B1 | * | 6/2002 | Thomas ....................... 709/224 |
| 6,421,675 | B1 | * | 7/2002 | Ryan et al. .................. 707/100 |
| 6,484,203 | B1 | * | 11/2002 | Porras et al. ................ 709/224 |
| 6,513,032 | B1 | * | 1/2003 | Sutter ............................. 707/3 |
| 6,643,650 | B1 | * | 11/2003 | Slaughter et al. ............. 707/10 |
| 6,675,170 | B1 | * | 1/2004 | Flake ........................... 707/101 |
| 6,697,826 | B1 | * | 2/2004 | Kumar et al. ............. 707/103 R |

FOREIGN PATENT DOCUMENTS

WO      WO 200062226 A2 * 10/2000 ............ G06F/17/60

OTHER PUBLICATIONS

Waldo, J. "The Jini Architecture for Network–Centric Computing," in Communications of the ACM, vol. 42, No. 7, Jul. 1999, p. 76–82.*
Sun. "Jini Lookup Service Specification—Revision 1.0", Sun Microsystems Inc., Jan. 1999.*
Sun. "Jini Architectural Overview", Sun Microsystems Inc., Technical White paper, Jan. 1999.*

* cited by examiner

Primary Examiner—William A. Cuchlinski, Jr.
Assistant Examiner—Yemane M. Gerezgiher

(57) ABSTRACT

A method and system are provided for defining a search space of a community in which a client may search for resources. A client providing a resource registers the resource with a core. The core then lists the resource with an advertising service, which serves multiple cores. A client searching for a resource can search in the client's core and within the advertising service serving the clients core. In addition, a client searching for resources can define a community of advertising services remote to the client's core, then designate the community when sending an attribute-based search for computer resources to the client's core. In some embodiments, once a community is defined, a client can subscribe to an events within the community by searching for an event distributor within the community. The client is then notified of events occurring within the community that match the client's event subscription.

20 Claims, 14 Drawing Sheets

| | |
|---|---|
| 502 — Vocabulary | The definition of the attributes and their types used in descriptions and lookups |
| 504 — Resource Handler Mailbox | The process/thread/task that handles the Resource |
| 506 — Contract | Denotes the Application Programming Interface (API) supported by the provider, including version and similar information |
| 508 — Visibility and permissions | Access control information |
| 510 — Private Resource-specific data | Data important to the provider of the Resource, such as the provider's internal name for the Resource. |
| 512 — Public Resource-specific data | Data important to the user of the Resource, such as a stub for invoking methods. |

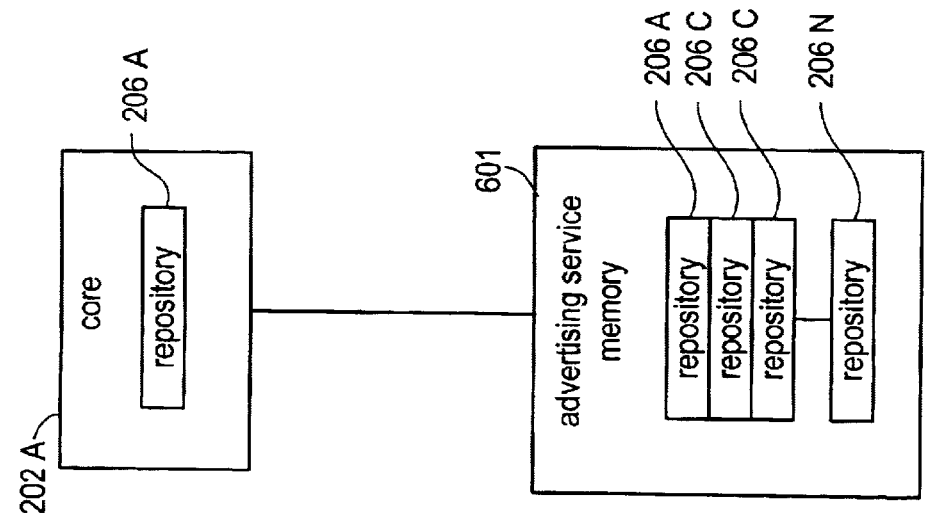
FIG. 7B ONLINE
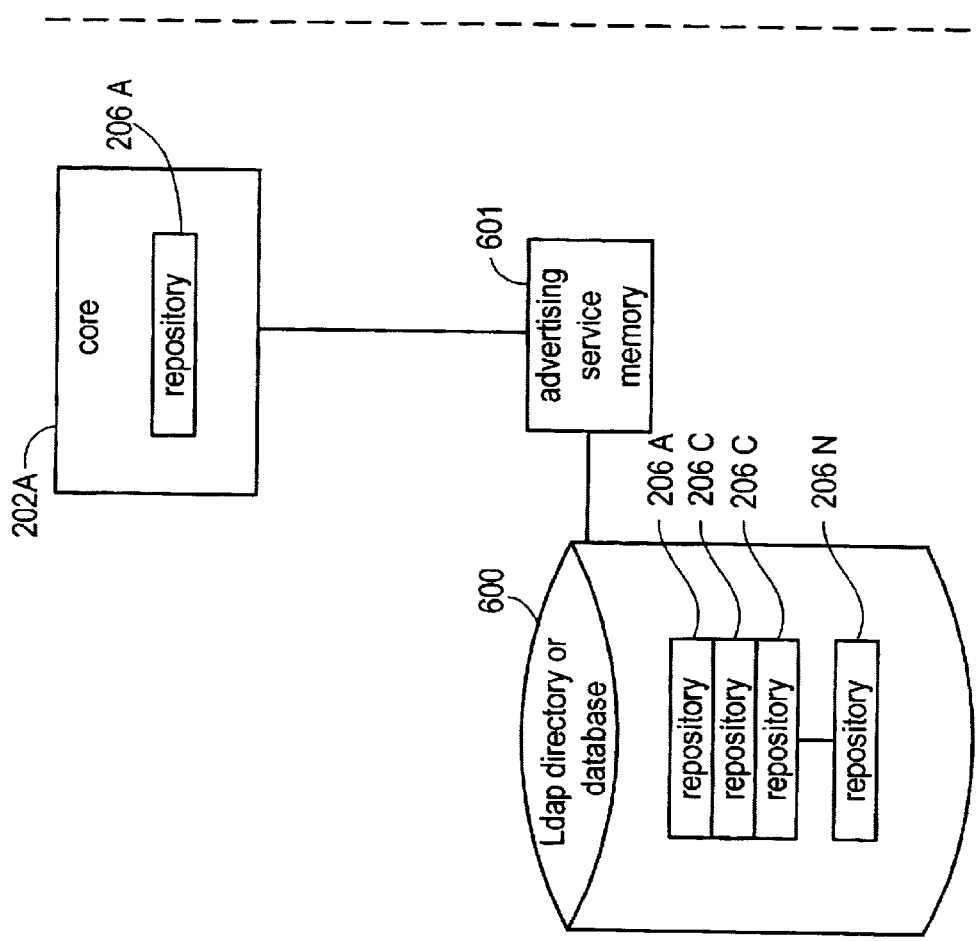
FIG. 7A OFFLINE

FINDING E-SERVICE IN CLIENT-DEFINED, LOOSELY COUPLED, E-SERVICE COMMUNITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO APPENDICES A AND B

Appendices A and B contain an architectural specification and a programmer's guide.

CROSS-REFERENCE TO CD-ROM APPENDIX AND APPENDIX C

An Appendix containing a computer program listing is submitted on a compact disk, which is herein incorporated by reference in its entirety. The total number of compact discs including duplicates is two. Appendix C which is part of the present specification, contains a list of the files contained on the compact disk.

BACKGROUND

Recent advances in computer and network technologies have resulted in an increasing number of computer services being offered to an ever-increasing number of potential users of the resources. In a computer network, a computer that provides a service is generally termed a server computer or server, and a computer using the service is generally termed a client computer or client. The client may be any user of the service such as another computer, a computer device, or an application program. Moreover, a server in one context may be a client in another. For example, a computer with a large storage capacity may be a server that offers storage or filing service to clients. The same computer may not have its own printer, and may be a client using a printing service offered by another computer.

The ability to quickly and easily locate computer services is necessary for the efficient use of those services. As the number of services available increases, it becomes more and more time-consuming and computer resource-intensive to search for needed services. Sun Microsystem's Jini™ includes a lookup service, but Jini's™ lookup service does not allow the client to limit the space in which the lookup happens.

SUMMARY

In a system where computer resources offered by clients are registered with cores, then listed on an advertising service serving the core, a method and system are provided for defining a search space or a community in which to search for resources. A client defines a community of advertising services remote to the client's core, then designates the community when sending to the client's core an attribute-based search for computer resources.

In some embodiments, once a community is defined, a client can subscribe to an events within the community by searching for an event distributor within the community. The client is then notified of events occurring within the community that match the client's subscription.

BRIEF DESCRIPTION OF THE DRAWINGS

FIG. 5 illustrates a message sent to a core to register a resource.

FIG. 7A illustrates an advertising service operating in offline mode.

FIG. 7B illustrates an advertising service operating in online mode.

DETAILED DESCRIPTION

Nomenclature

Figure 1:
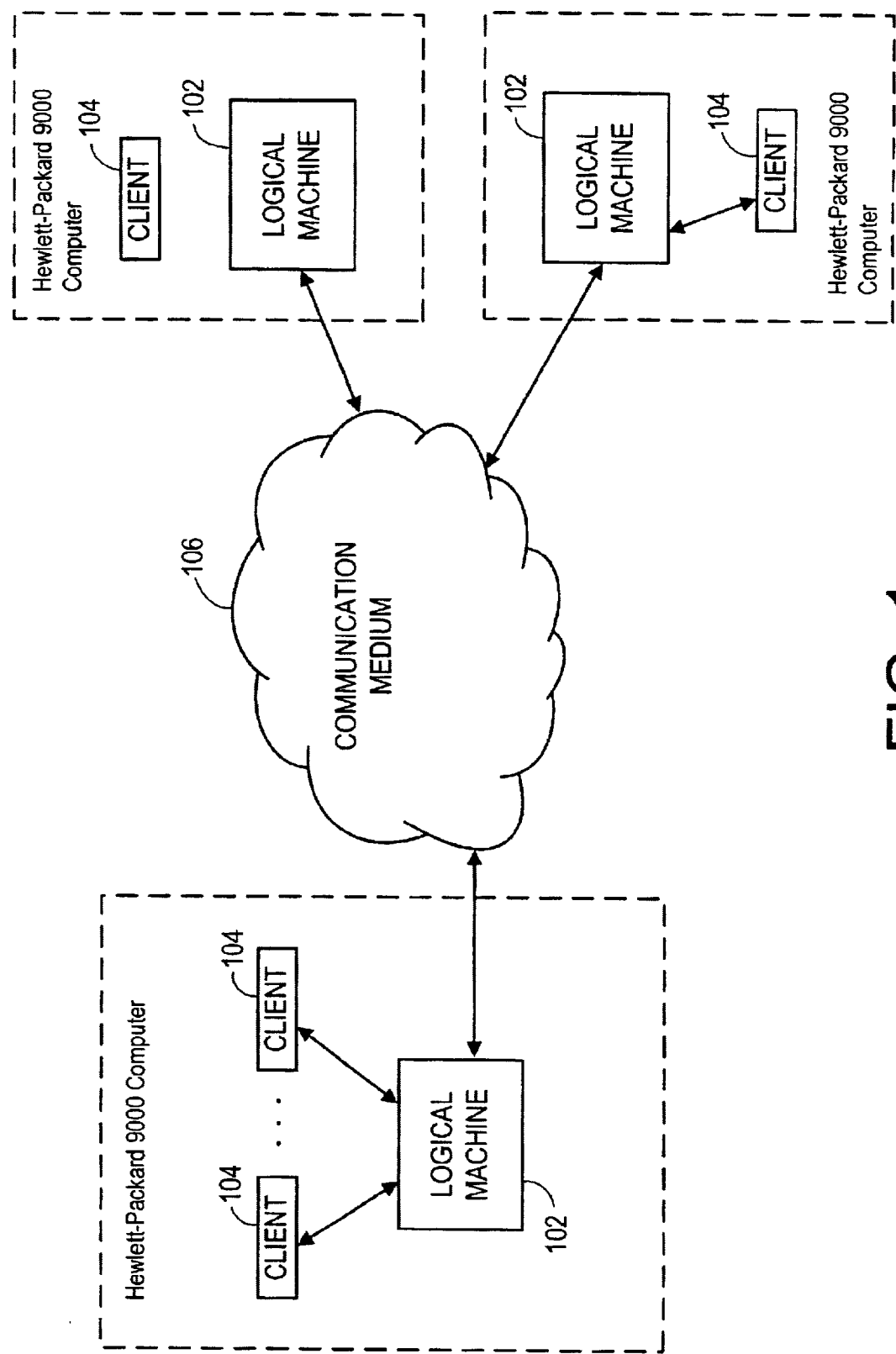
FIG. 1 illustrates an environment in which the present invention may operate.

The detailed description that follows is presented largely in terms of processes and symbolic representations of operations performed by conventional computers. A computer may be any microprocessor or processor (hereinafter referred to as processor) control device, including terminal devices, such as personal computers, workstations, servers, clients, mini computers, main-frame computers, laptop computers, a network of two or more computers, mobile computers, portable computers, handheld computers, palm top computers, set top box for a TV, an interactive television, an interactive kiosk, personal digital assistant, an interactive wireless device, a mobile browser, or any combination thereof The computers may possess input devices such as, by way of example, a keyboard, a keypad, a mouse, a microphone, or a touch screen, and output devices such as a computer screen, printer, or a speaker.

These computers may be single-processor or multi-processor machines. Additionally, these computers include memory such as a memory storage device or an addressable storage medium. The memory storage device and addressable storage medium may be in forms such as, by way of example, a random access memory (RAM), a static random access memory (SRAM), a dynamic random access memory (DRAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computers execute an appropriate operating system such as HP-UX®, Linux, Unix, Microsoft® Windows® 95, Microsoft® Windows®98, Microsoft® Windows® NT, Windows® 2000 Apple® MacOS®, IBM® OS/2®, and the like. The computers may advantageously be equipped with a network communication device such as a network interface card, a modem, or other network connection device suitable for connecting to one or more networks.

The computers, and the computer memory, may advantageously contain program logic or other substrate configuration representing data and instructions, which cause the computer to operate in a specific and predefined manner as described herein. The program logic may advantageously be implemented as one or more modules. The modules may advantageously be configured to reside in the computer memory and execute on one or more processors. The modules include, but are not limited to, software, and/or hardware components that perform certain tasks. Thus, a module may include, by way of example, components, such as, software components, processes, functions, subroutines, procedures, attributes, class components, task components, object-oriented software components, segments of program code, drivers, firmware, micro code, circuitry, data, and the like.

The program logic includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable, in the present invention. The operations described herein are machine operations performed in conjunction with the human operator or user that interacts with the computer or computers.

It should also be understood that the programs, modules, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Introduction to Architecture

The present invention provides a mechanism for defining a search space or community in which one may locate computer resources. As used herein, a resource is a uniform description of active entities, (e.g., a computational service), or passive entities (e.g., a hardware device). A resource may be referred to as a service or an e-service. Access to the resources is mediated by a resource-handling platform. The operations performed by the resource-handling platform necessary to mediate access to resources are performed on one or more logical machines. There may be multiple logical machines on a single physical machine such as a computer, or the components of a single logical machine may be distributed across multiple physical machines.

The resource-handling platform deals only with data about resources, not the data that makes up the resource. Such data describing resources are referred to herein as metadata For example, when the resource-handling platform deals with a file resource, the resource-handling platform uses only data describing the attributes of the file and how the file is accessed. The resource-handling platform does not access the file directly. A resource-specific handler attached to the resource-handling platform directly accesses the file resource based on messages received from the resource-handling platform.

A client is an entity that requests access to resources or responds to such requests. Thus, a client may be a user or a service provider. Only a portion of the resource-handling platform is visible to each client. The portion of the resource-handling platform that is visible to the client is known as that client's protection domain. Each client has at least one client library. The client library provides a service interface for the client to connect to the client's library. All client applications and resource-specific handlers are linked to the client library. The client library then communicates with the resource-handling platform through an application interface.

Access to a resource involves two stages. First, the resource-handling platform locates the resource and determines whether a client may access the resource. Once the resource is discovered and access is determined, the resource-handling platform sends messages to a resource-specific handler. The second stage is the direct access to the resource by the resource-specific handler.

Each logical machine has a core. All resource access is performed through the core. The core uses resource metadata to mediate and control each access to a resource. To access a resource, a client sends a message to the core naming the resource. The core uses the resource metadata to determine if access is allowed and to locate the appropriate resource handler. The core then forwards a message to the resource handler which actually accesses the resource.

In one embodiment, the invention is implemented using the Hewlett-Packard E-Speak Service Engine Development Platform Release 3.01 executing on a Hewlett-Packard 9000 computer running the HP-UX® operating system version 11.00. In this embodiment, the resource-handling platform is the E-Speak environment. The service interface is the E-Speak Service Interface (ESI). The application interface is the E-Speak Application Binary Interface (ABI). E-Speak logical machines communicate with each other using the E-Speak Service Interchange Protocol (ESIP).

Referring now to the drawings, FIG. 1 illustrates an environment in which a search space definition system and method according to an embodiment of the present invention operate. In particular, the search space definition system and method may be implemented using the Hewlett-Packard E-Speak Service Engine Development Platform Release 3.01 executing on a Hewlett-Packard 9000 computer running the HP-UX® operating system version 11.00. As depicted in FIG. 1, the environment is comprised of three Hewlett-Packard 9000 computers, each including a logical machine 102 connected to one or more clients 104, connected to each other through a communication medium 106. In other embodiments, multiple logical machines 102 may reside in a single Hewlett-Packard 9000 computer. In still other embodiments, the components of an instance of logical machine 102 may be distributed across multiple Hewlett-Packard 9000 computers. In yet other embodiments, certain aspects of the search space definition system and method may be implemented on a single Hewlett-Packard 9000 computer. In such instances, the environment is comprised of the one or more clients 104 and logical machine 102 executing on a single Hewlett-Packard 9000 computer.

Although a Hewlett-Packard 9000 computer, an E-Speak Service Engine Development Platform, and a HP-UX® version 11.00 is specified, those skilled in the art realize that other computers, development software, and operating systems can be used to implement the invention as disclosed herein. Accordingly, the invention is not limited to any particular type or brand of computer, operating system, or software development platform.

In one embodiment, an instance of logical machine 102 mediates access to one or more resources accessible through logical machine 102. In particular, logical machine 102 facilitates and controls the creation, management, and distribution of one or more resources and the permissions that may be associated with each resource. Logical machine 102 controls what actions may be performed on a resource and who may perform the action on the resource.

Client 104 may be an entity, such as, by way of example, a process, thread, service provider, and the like, that executes on a computer and that requests access to one or more resources or responds to such requests. Client 104 communicates with logical machine 102, for example, using one or more messages, to define a search space to locate and access a resource. Client 104 and logical machine 102 may communicate utilizing transport mechanisms (e.g., TCP, HTTP, remote procedure call, shared memory, and the like). As depicted in FIG. 1, client 104 and logical machine 102 reside on the same computer. In other embodiments, one or more clients 104 may reside in a different computer from logical machine 102 and communicate with logical machine 102 through a network such as, for example, communication medium 106.

Communication medium 106 facilitates the transfer of electronic content between the attached computers. In some embodiments, communication medium 106 includes the Internet. The Internet is a global network connecting millions of computers. The structure of the Internet, which is well known to those of ordinary skill in the art, is a global network of computer networks and utilizes a simple, standard common addressing system and communications protocol called Transmission Control Protocol/Internet Protocol (TCP/IP).

Communication medium 106 may also be comprised of one or more other types of networks. By way of example, communication medium 106 can include local area networks (LANs), wide area networks (WANs), metropolitan area networks (MANs), public internets, private intranets, a private computer network, a secure internet, a private network, a public network, a value-added network, interactive television networks, wireless networks, two-way cable networks, interactive kiosk networks, and the like. Communication medium 106 may comprise other communication protocols such as the International Standards Organization's Open Systems Interconnection, IBM's SNA®, Novell's Netware®, and Banyon VINES®, that facilitate communication between the attached computers.

Figure 2:
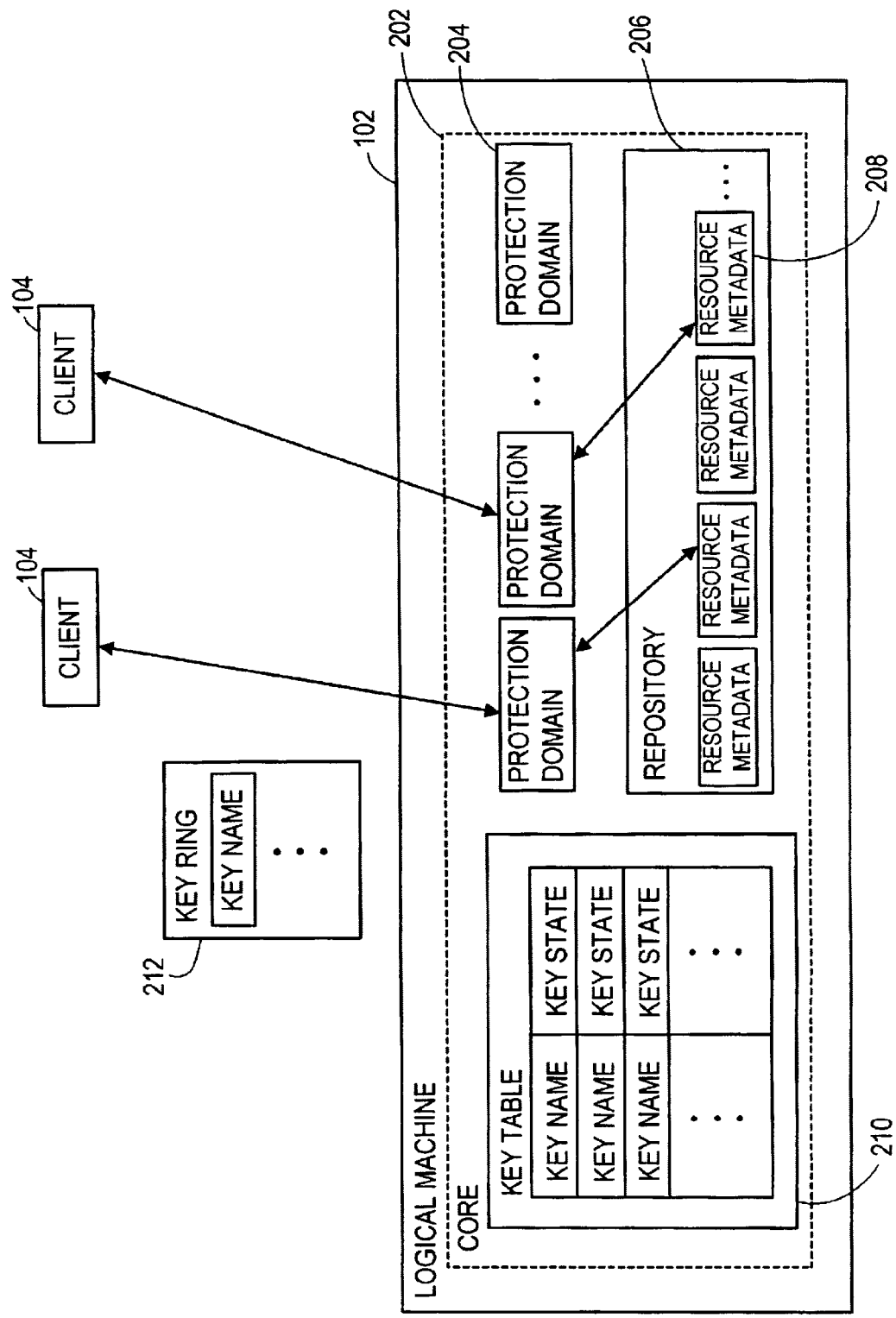
FIG. 2 illustrates, in a block diagram, one embodiment of a logical machine.

FIG. 2 is a block diagram illustrating one embodiment of an instance of logical machine 102. Logical machine 102 is a single instance of the modules and other components necessary to define a search space to locate a resource by a client 104 as described herein. In particular, FIG. 2 illustrates selected components of the logical machine 102 according to one embodiment of the present invention. As shown, the logical machine 102 includes a core 202.

Core 202 also processes requests to search for a resource based on one or more criteria, requests to make a resource or service accessible through core 202, requests to remove a resource from core 202, thus making the resource no longer accessible through core 202, and other requests that facilitate the management of the resources available through core 202. For example, to access a resource, client 104 sends a message to core 202 naming the resource that client 104 wants to access. Client 104, in requesting the resource, may specify and send a key ring 212 to core 202. Core 202 processes the received request and, using key ring 212 and the data and information maintained by core 202, determines if access to the resource is allowed. If access is allowed, core 202 forwards the message, for example, utilizing a routing module, for subsequent processing. In another example, core 202 processes a client 104 request to create a resource in core 202. The created resource is subsequently made available to other clients 104 wishing to access the resource.

As depicted in FIG. 2, core 202 is comprised of one or more protection domains 204, a repository 206, and a key table 210. In some embodiments, core 202 maintains at least one protection domain 204 for each client 104. The protection domain 204 contains the information core 202 needs in managing a corresponding client 104. Core 202 utilizes protection domain 204 maintained for the particular client 104 in processing messages received from the respective client 104. Protection domain 204 encapsulates the respective client's 104 view of the system of resources and mediates communication between the respective client 104 and the requested resources. A client 104's environment is maintained in the modules, data, and other information contained in an instance of protection domain 204.

In one embodiment, client 104 can have more than one protection domain 204 in core 202. In such instance, client 104 specifies a default or active protection domain 204. Core 202, in processing client 104's request to access a resource, uses the respective client 104's active protection domain. For example, when core 202 receives a message from client 104, the core uses the information contained in client 104's active protection domain 204 to determine if access should be granted. Core 202 includes one or more functions that client 104 can use to create and modify a corresponding protection domain 204, as well as select another protection domain 204 as active protection domain 204.

Figure 3:
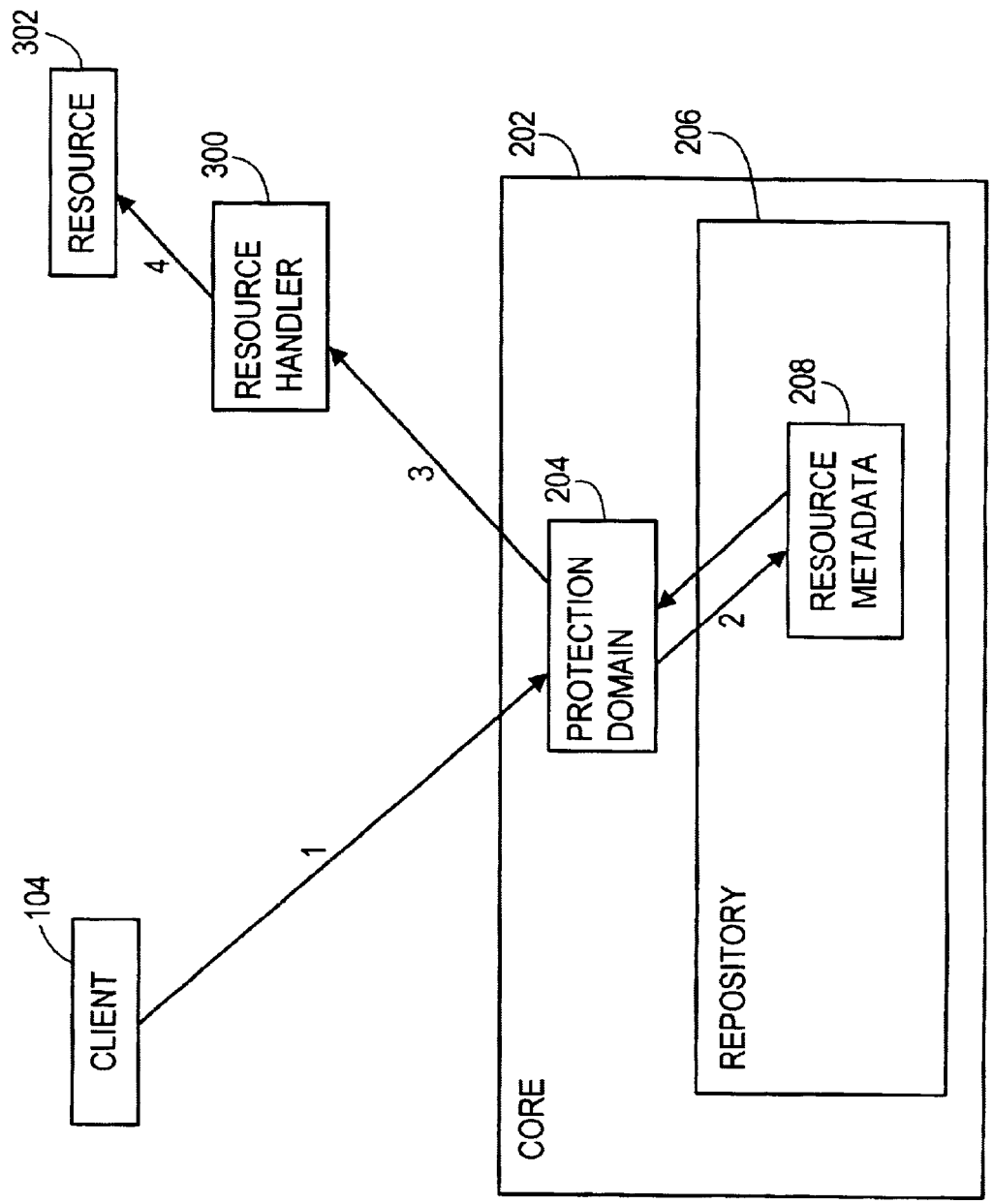
FIG. 3 illustrates one embodiment of a communication flow when processing a client's request for a resource.

FIG. 3 is an event diagram illustrating an exemplary method of communication flow between client 104 and the core when a client requests a resource. First, in event 1, client 104 sends a message to core 202. Client 104 specifies information such as a requested resource 302, a requested operation or method on a resource 302, and the like. Core 202 then identifies a client 104 and instantiates an instance of the protection domain 204 belonging to client 104. Protection domain 204 advantageously mediates the message sent by the corresponding client 104.

Core 202 then checks if client 104 has permission to access the requested resource or operation or method on the resource in event 2. Once permission is negotiated, core 202 sends a message to a resource handler 300 in event 3. The message payload is the message contents sent by client 104 to core 202 requesting the resource, less any permission information and other data intended for core 202. An appropriate resource handler is specified in a resource handler field of resource metadata 208 retrieved from a repository of core 202.

The requested resource operation is performed in event 4. If the requested resource is an activity, such as a process executing on a computer, the resource handler may send the resource a message requesting an authorized operation. If the requested resource is a passive resource, (e.g. a file) the resource handler may execute an authorized operation requested by client 104.

Locating Resources Within a Client's Group

Figure 4B:
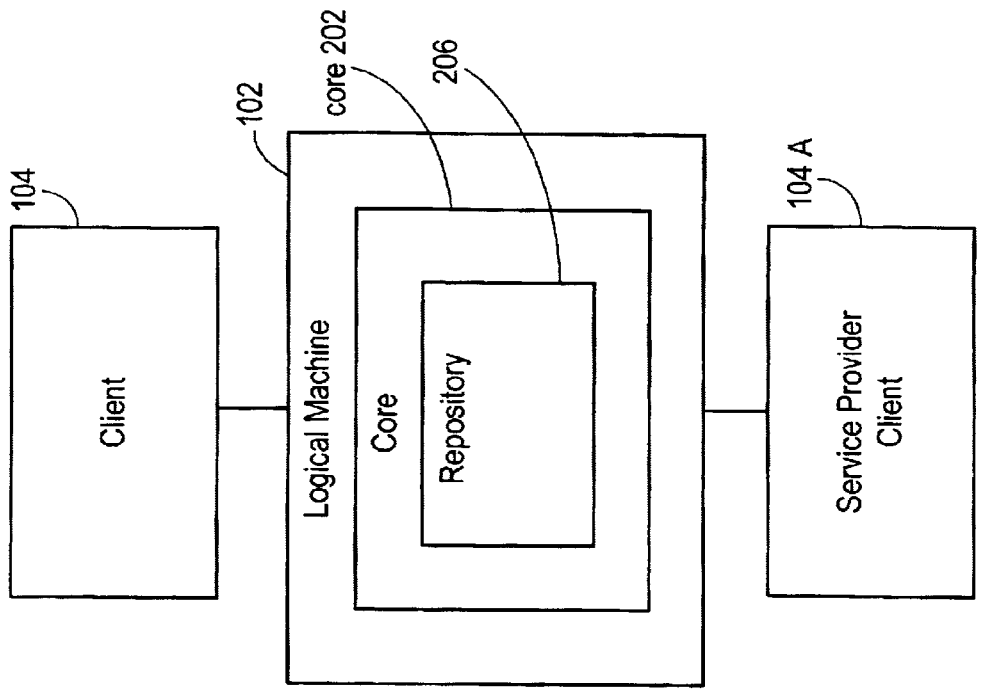
FIG. 4B illustrates a system for implementing the method of FIG. 4A.
Figure 4A:
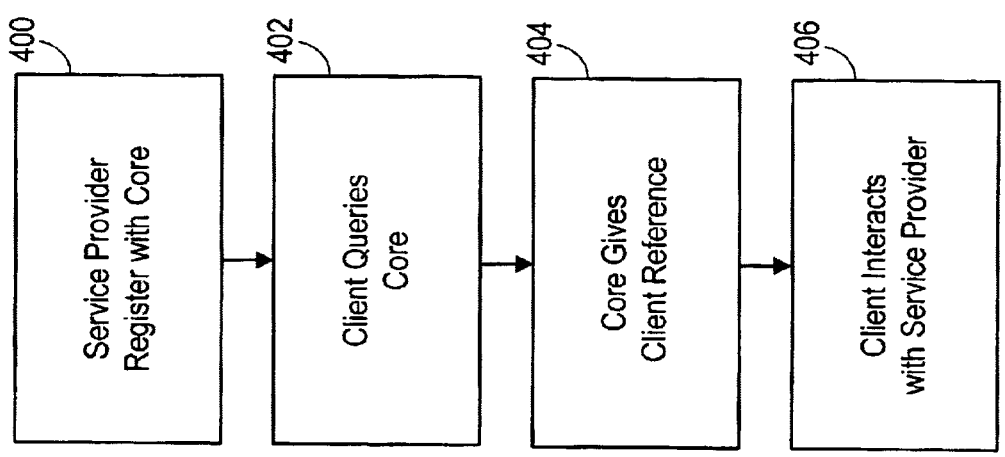
FIG. 4A illustrates, in a flowchart, one embodiment for locating a resource.

Efficient and accurate location of resources is crucial to the proper functioning of the architecture described above. FIG. 4A is a flowchart illustrating one method of locating resources. FIG. 4B is a block diagram illustrating a system suitable to implement the method of FIG. 4A. FIG. 4B includes a logical machine 102 with a core 202 and a repository 206 as described above in reference to FIG. 2.

In stage 400 (FIG. 4A), a client 104A who is a service or resource provider registers its resource with core 202. Core 202 thus stores a description of the resource provided by client 4A in the repository 206 of core 202. FIG. 5 illustrates an example of a description 500 of a resource submitted to core 202 to be stored in repository 206. In some embodiments, description 500 is a message sent to core 202 by client 104A.

Description 500 includes a vocabulary 502 and a contract 506. Vocabulary 502 defines the attributes of the resource. The resource provider specifies a vocabulary, which is essentially a category, then the attributes of the resource. For example, if the resource a client wants to register is a car for sale, the vocabulary may be "car" and the car vocabulary may have two attributes, "model" and "price." In some embodiments, vocabulary 502 is an XML schema describing the resource.

Contract 506 describes the application programming interface (API) supported by the resource provider. Description 500 may also include a resource handler mailbox 504, visibility and permissions 508, private resource-specific data 510, and public resource-specific data 512. Resource handler mailbox 504 contains information for accessing a handler of the client's interaction with the resource. Visibility and permissions 508 define who may access the resource. Private resource-specific data 510 describes data important to the provider of the resource, such as the resource provider's internal name or reference number for the resource. Public resource-specific data 512 describes data important to a user of the resource. Typically, private resource data 510 and public resource data 512 are not interpreted by core 202.

Returning to FIG. 4A, in stage 402, another client 104 queries core 202 with a description of a resource sought by client 104. Typically, a query is a list of attributes of the desired resource, which are checked against the vocabularies listed in repository 206. Core 202 checks the client's query against the resource description stored in repository 206. In some embodiments, both vocabulary 502 and contract 506 of a resource listed in repository 206 must match the client's query in order to be considered a match. If a match is found, core 202 sends a message to client 104 (stage 404). The message contains a reference to the service provider client 104A who registered the matching resource with core 202. The client then interacts with service provider client 104A as described in reference to FIG. 3.

In the method described in FIGS. 4A and 4B, all messages between a client 104 seeking resources and a client 104A providing resources are handled by the core. The method described in FIGS. 4A and 4B works efficiently as long as the number of participants is small, for example, if the participants are employees in one particular office and the resources are office services such as printers, copiers, and the like. If the number of participants is large, multiple cores may be necessary to support all the participants, thus a client may need to search all cores in order to find the most appropriate resource. Searching each core individually takes time and computer resources. Accordingly, the repositories of each core are sent to a single entity which stores the repositories and responds to queries from clients. This single entity is referred to as an advertising service. The advertising service, as well as the plurality of cores that are served by an advertising service, are referred to as a group.

Figure 6:
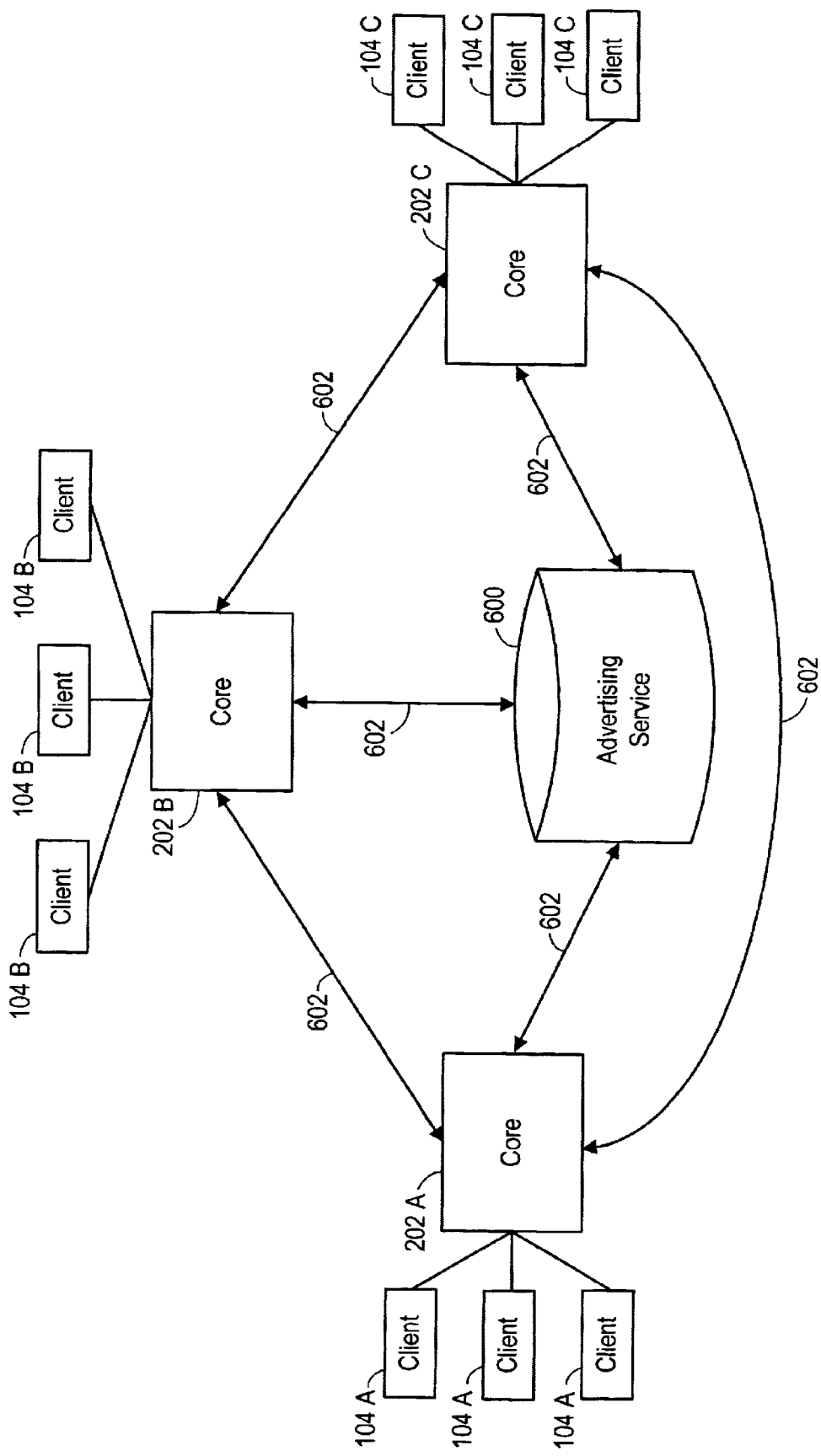
FIG. 6 illustrates an advertising service.

FIG. 6 illustrates an exemplary embodiment of an advertising service. The advertising service is connected to three cores: 202A, 202B, and 202C. The cores are also connected to each other so the cores can communicate directly without going through the advertising service, for example, after a resource has been identified from the advertising service. In some embodiments, connections 602 are not direct connections between the cores and between the cores and the advertising service, rather each of the cores and the advertising service are connected to a communication network such as the Internet.

Each core serves a number of clients 104A, 104B, and 104C. A client providing a resource registers with the client's core. Once a client has registered with a core, only that core sends and receives messages from the client relating to the resource handling platform. The core with which the client has registered is also referred to as the system core. For a given client, any core other than the system is referred to as a remote core. For example, once client 104A has registered with core 202A, only core 202A may send messages to or from client 104A. After client 104A sends a message to core 202A to register its resource, client 104A's registration information is stored in the repository of core 202A. Core 202A also forwards client 104A's registration information to advertising service 600. Each core connected to advertising service 600 replicates its repository in the advertising service in this manner. As a result, advertising service 600 contains a copy of the repository of every core served by the advertising service.

A client looking for a resource sends a query to that client's core. For example, client 104B may only send a query to core 202B. Core 202B then searches for a match in its own repository. If no match is found in the repository of core 202B and the advertising service is operating in online mode as described below, the query is forwarded to advertising service 600, which runs the query against the copies of the repositories of all the cores served by advertising service 600. If the advertising service is operating in offline mode as described below, the query is run in the advertising service's repository. This discussion assumes that each resource registered in each core is advertised in the advertising service. In some embodiments, a resource provider client may choose not to advertise the resource it has registered. Such resources would not be listed in the advertising service.

Advertising service 600 may operate in one of two modes, online mode and offline mode. FIG. 7A illustrates an advertising service operating in offline mode. Advertising service repository 600 contains copies of several repositories 206A–206N propagated to the advertising service by cores 202A–202N served by the advertising service. In offline mode, the advertising service stores core repositories 206A–206N in repository 600, a light-weight directory access protocol (LDAP) directory, available from Netscape Communications of Mountain View, Calif. or in a database. FIG. 7B illustrates an advertising service operating in online mode. In online mode, the advertising service stores core repositories 206A–206N in memory 601 of the advertising service.

The online mode requires an advertising service to be registered in each core that is part of the group. These advertising services connect to each other and form a logical group. A core need only send queries to the advertising service that is registered with it. The local advertising service then forwards the query to the other advertising services in the group and collects the responses.

Figure 8:
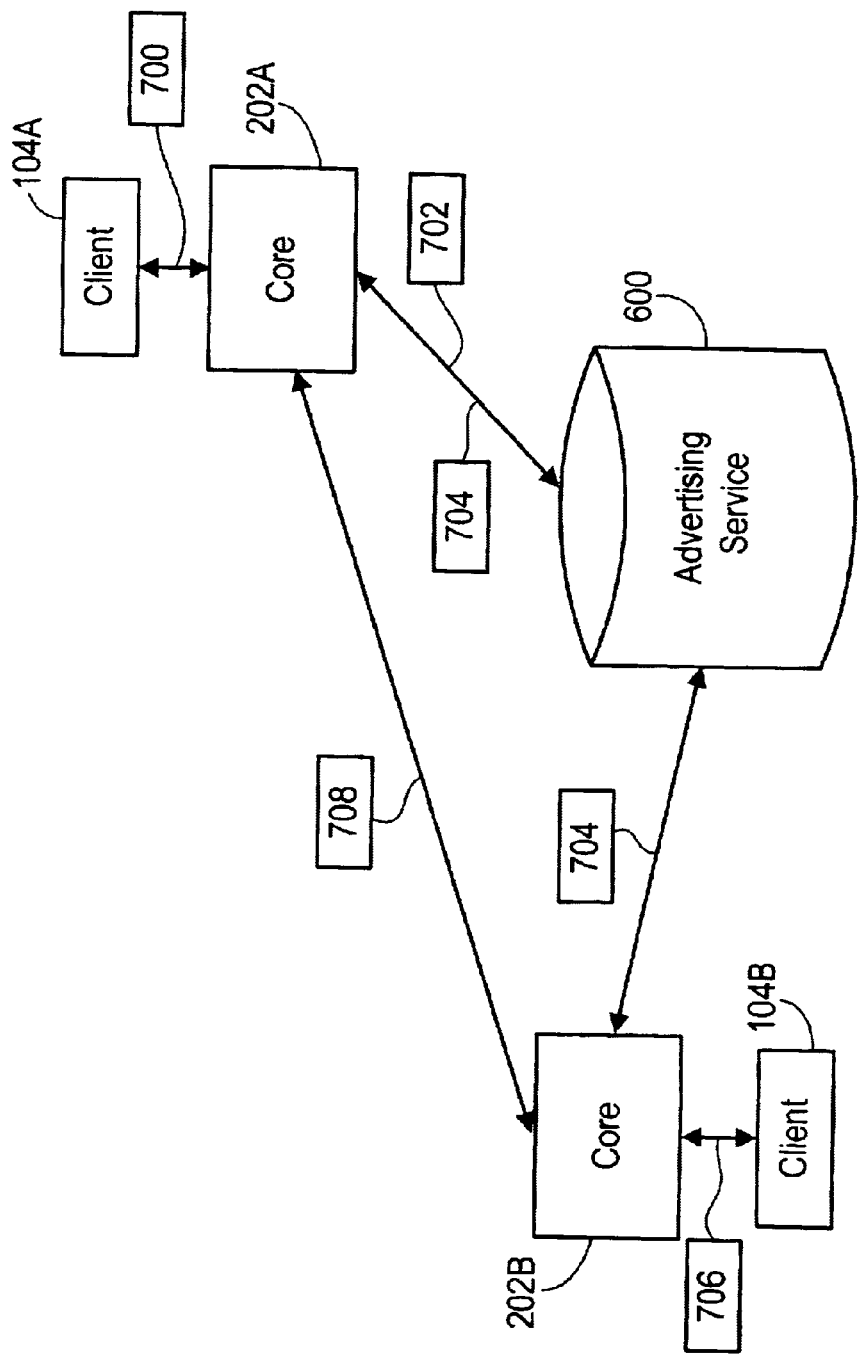
FIG. 8 illustrates, in a flowchart, locating and accessing a resource registered on a remote core using an advertising service.

FIG. 8 illustrates a method of locating a resource registered with a remote core, using an advertising service in online mode. A service provider client 104A registers his resource with core 202A by sending message 700. Message 700 is described in reference to FIG. 5. Core 202A then registers client 104A's resource with advertising service 600 by sending message 702. Message 702 contains a portion of the information of message 700, such as the vocabulary and the contract of client 104A's resource. Message 702 also identifies core 202A as client 104A's core. Message 702 does not contain information such as the resource handler mailbox of FIG. 5. The description of client 104A's resource is then stored in advertising service 600.

Client 104B searches for a resource by sending a query 706 to core 202B. Core 202B first runs the query against core 202B's own repository. If a resource is located in core 202B's repository, reference to that resource is forwarded to client 104B. If no match is found in core 202B's own repository, core 202B sends the query to the advertising service available locally. If a match is found, for example if client 104A's resource matches client 104B's query, core 202B sends a message 708 to core 202A requesting client 104A's resource. Core 202A then checks client 104B's permission and forwards the resource handler address to core 202B according to the process described in reference to FIG. 3.

Locating Resources Outside a Client's Group

A client may wish to access resources that are outside the client's group. Through the core with which a client has registered, also called the home core or system core, the client can discover the resources of all the cores served by the same advertising service as the home core. For example, a client's home core may represent the client's particular office within a company. The advertising service may advertise resources available at any of the offices in the company. The resources available through the advertising service served by the client's home core are within the client's group. Occasionally, a user must look beyond her client's group to find resources. For example, when the user is travelling to a place where his/her company does not have an office, in order to locate a resource she must search outsider his/her group. Accordingly, a mechanism is provided for a client to locate resources outside the client's group.

Figure 9A:
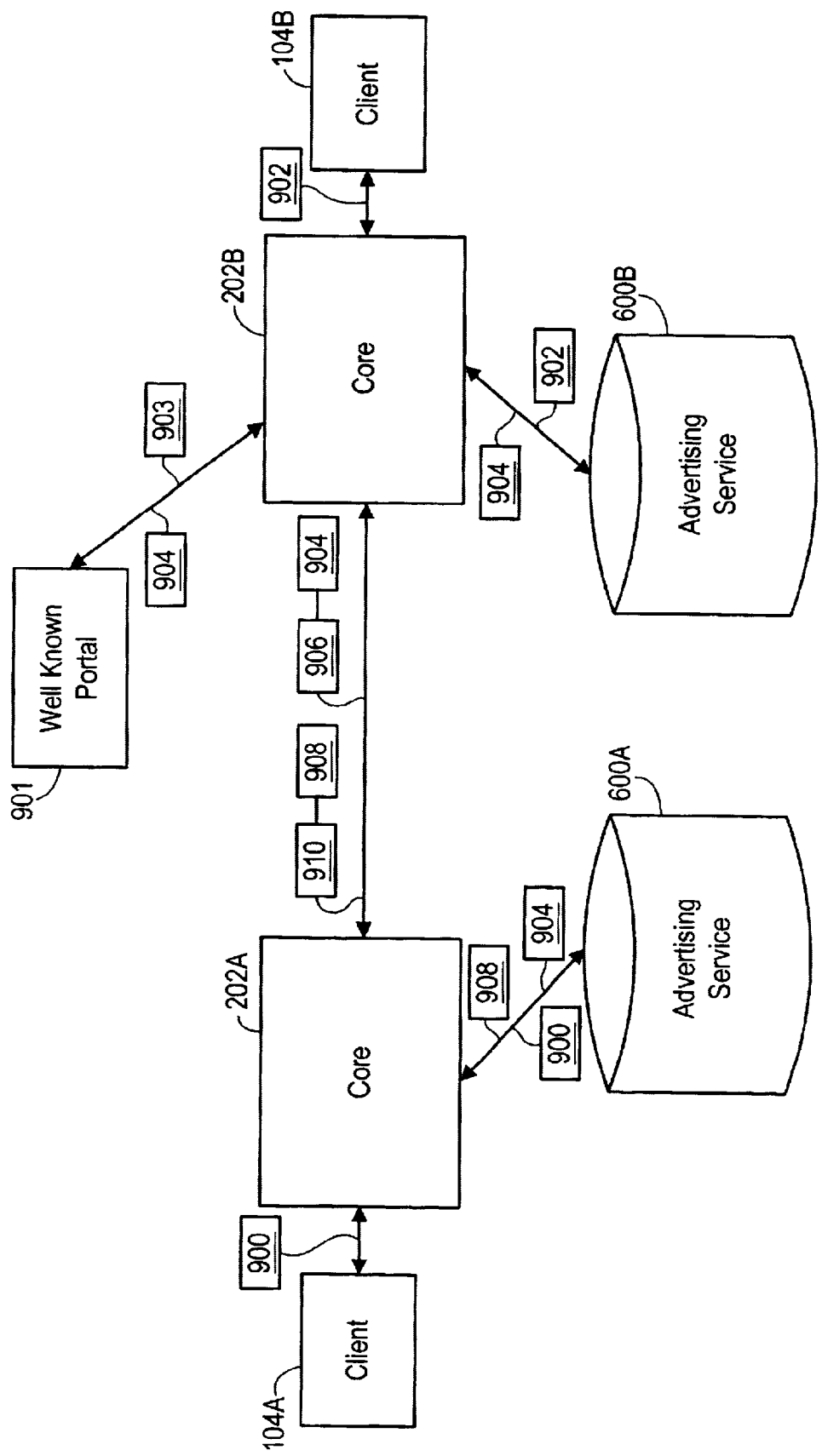
FIG. 9A illustrates one embodiment of a system for discovering resources across multiple advertising services.
Figure 9B:
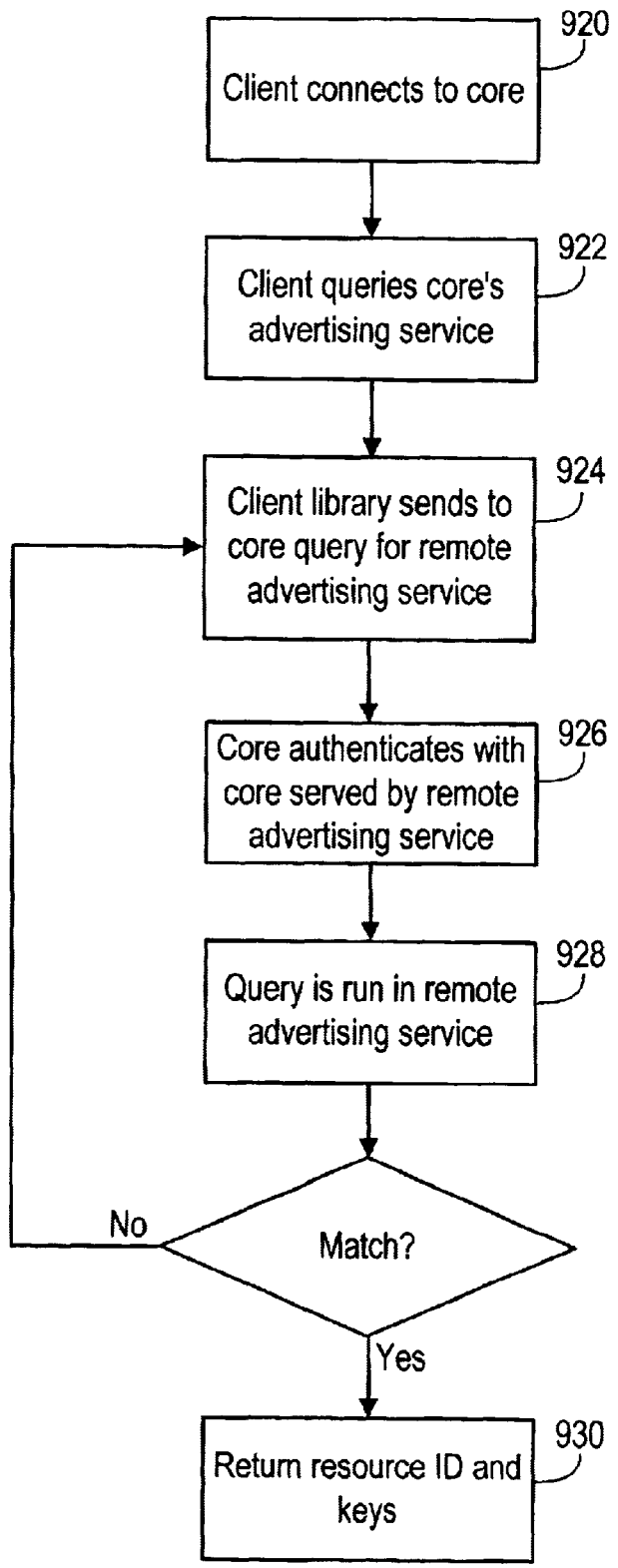
FIG. 9B illustrates, in a flowchart, one embodiment of a method of discovering resources outside a client's group.

FIG. 9B illustrates a method of locating a resource outside a client's group. FIG. 9A illustrates a system appropriate for implementing the method described in FIG. 9B. In stage 920 (FIG. 9B), the client connects to the client's home core. The client searches for a resource by querying the advertising service serving the home core in stage 922. The advertising service runs the query against the repositories stored locally. If no match is found, client library sends the query to the remote advertising service (stage 924).

An advertising service can locate remote advertising services in several ways. In some embodiments, a core discovers other cores using a multicast-based protocol. An advertising service locates other advertising services using a multicast protocol. Essentially, each advertising service has a thread that listens for multicast messages on a specific well known port. When a new advertising service wants to join a group, it sends out a multi-cast request on the well known port. The other advertising services that are listening on the well known port respond to the initial request. This protocol allows the new advertising service to locate existing advertising services and allows existing advertising services to add the new advertising service to the group. In this manner new advertising services can be dynamically added to groups without any changes to the client programs. The new searches can now access the resources advertised in the new advertising service without any changes to the client code. Once other cores are discovered, the first core sends a discovery request, requesting information on where the advertising service for a group of cores is running and how to access it.

In some embodiments, all advertising services advertise themselves by registering with a well-known portal that can be used by anyone to advertise and can be queried by anyone looking for services. Each advertising service advertised on the well-known portal includes a description of the advertising service and a connection object for connecting to a core served by the advertising service. The connection object is a piece of information which may be used to make connection to a core served by the advertising service. In some embodiments, the advertising services of an organization advertise themselves to a representative advertising service which in turn advertises itself to the well-known portal. In these embodiments, the querying advertising service selects one or more advertising services advertised on the portal in which to run the querying advertising service's query.

In stage 926, the client's home core connects to the remote core served by the remote advertising service in which the querying advertising services wishes to query, and authenticates itself with the remote core. The home core presents the query along with the requesting client's key ring. The remote core checks the keys presented in the key ring against the locks on the resources requested by the client. Authentication is described in more detail in U.S. application Ser. No. 09/675,263, filed Sep. 28, 2000, commonly assigned, entitled "An Access Control Mechanism For Remote Method Invocations Using Method-Permission Maps," and incorporated herein in its entirety by this reference. In one embodiment, core-to-core authentication is performed using ESIP.

Once the home core is authenticated by the remote core, the client's query is run in the remote advertising service (stage 928). If a match is found, the remote core returns a message identifying the matching resource (stage 930). The remote core may also return a key ring representing the client's capability to access resources advertised in the remote advertising service. If no match is found, the client library repeats the process by sending the query to other advertising services in the community.

FIG. 9A illustrates a system for implementing the embodiment described in FIG. 9B. A service provider client 104A first registers with a core 202A by sending message 900. Client 104A's resource is registered in the repository of core 202A and replicated in advertising service 600A. A resource-seeking client 104B sends a query 902 to the client's home core 202B requesting a resource. The query is run in the home core's advertising service 600B. If no match is found, the query is returned to home core 202B in message 904. Message 904 may also include identification of a remote advertising service in which to run the query contained in message 904.

If no remote advertising service is specified by the advertising service, query 904 is sent to well-known portal 901. Well-known portal searches for a matching advertising service. If a match is found, a connection object 903 for connecting to a core served by the matching remote advertising service is returned to core 202B.

Home core 202B uses connection object 903 to connect to remote core 202A. Core 202B sends query 904, along with the client's key ring for authentication, to remote core 202A. Core 202A authenticates home core 202B, then runs query 904 in remote core 202A's advertising service 600A. If a match is found, advertising service 600A returns a message identifying the matching resource 908 to remote core 202A. Message 908, along with a key ring 910 representing client 104B's capability to access the resources in advertising service 600A, is then returned to core 202B. Core 202B can then access the resource using the resource identification and client 104B's key ring.

In some embodiments, where a community as described below is used to locate resources, the connection object is obtained from the community definition string itself For example, to add an entry to a community, the hostname, port, and group name of the entry are specified to the core. This string is enough to construct the connection object. Therefore, the connection object need not be looked up.

In accordance with the above described embodiment, a core served by an advertising service querying a remote advertising service is authenticated by a core served by the remote advertising service before any query is run in the remote advertising service. Thus, unauthorized users are prevented from accessing the resources advertised in the remote advertising service. For example, a consultant who works for company 1, but is consulting at company 2, can connect to his/her core at company 1 and query his/her core for a resource at company 2. The consultant's home core queries the home core's advertising service. When no match is found, the company 1 home core sends a query to be run in an advertising service serving a company 2 core. The company 1 home core can locate the company 2 advertising service by first connecting to a well-known portal. The company 1 core authenticates itself with the company 2 core. The company 2 core thus grants the consultant the capability to access company 2 resources granted to company 1. The advertising service serving the company 1 core thus runs its query in the advertising service serving the company 2 core, then returns the resource at company 2 requested by the consultant.

Locating Resources Using a Client-Defined Community

Once a client has located resources advertised in remote advertising services, as described above, the client can define a community in which to search for resources. A community is a group of one or more remote advertising services. By defining a community, a client can avoid the possibly time- and computer resource-intensive process for locating remote advertising services. By searching within a community, the client avoids searching in advertising services that the client knows list no useful resources.

For example, assume a client is aware often auction websites, 1–10, each listed on a different advertising service. The client may find auction sites 1–3 useful for searching for computers, and auction sites 3–7 useful for searching for baseball cards. The client can define two communities, the first including the advertising services listing auction websites 1–3 for searching for computers and the second the advertising services including auction websites 3–7 for searching for baseball cards. By searching for baseball cards only within the baseball card community, the client can perform more efficient searches because the client does not waste time and effort searching in advertising services which the client already knows list no useful resources.

Figure 10A:
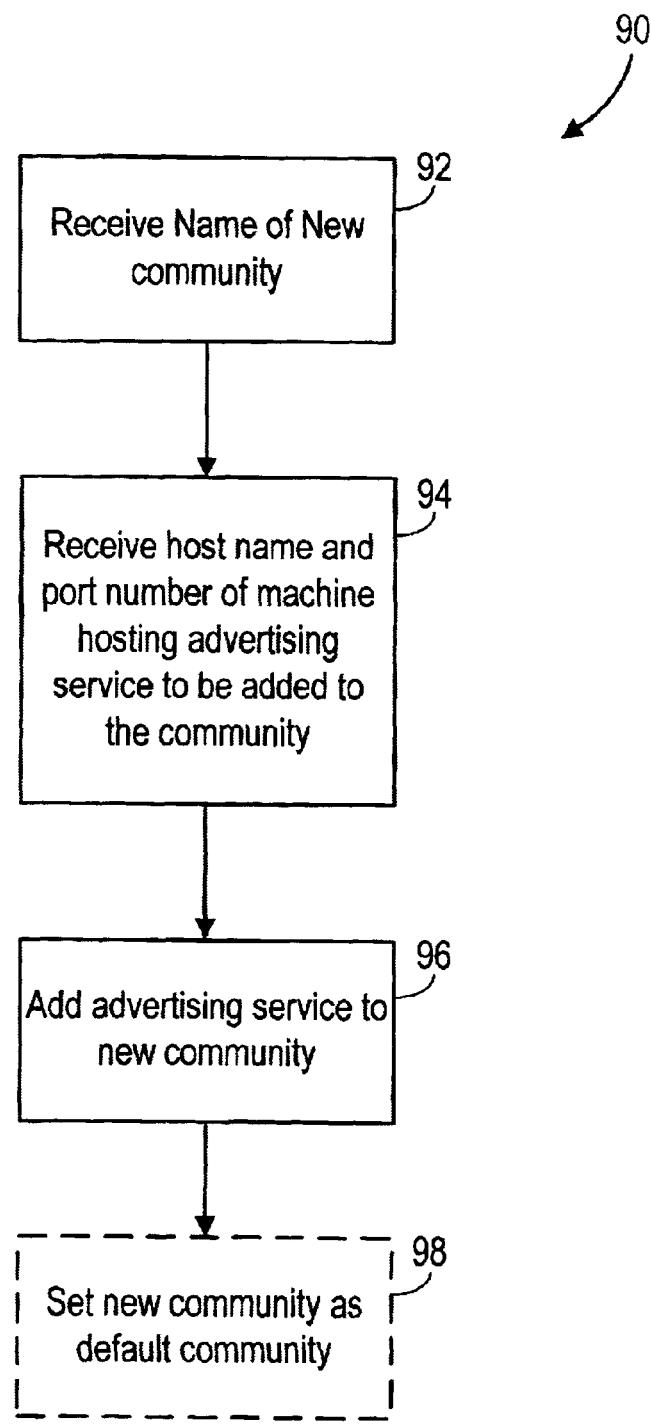
FIG. 10A illustrates, in a flowchart, one embodiment of tasks performed by a system core in creating a client-defined community.

FIG. 10A illustrates, in a flowchart, acts performed by a system core in implementing a method 90 of creating a client-defined community. In stage 92, the system core receives from the client the name of a new community, e.g. "baseball card auction sites." The system core then receives from the client the host name and port number of a machine hosting a remote advertising service to be added to the community. The advertising service has been previously discovered by the client using methods described above. In optional stage 98, if requested by the client, the system core sets the newly-defined community as the default community for searching.

Figure 10B:
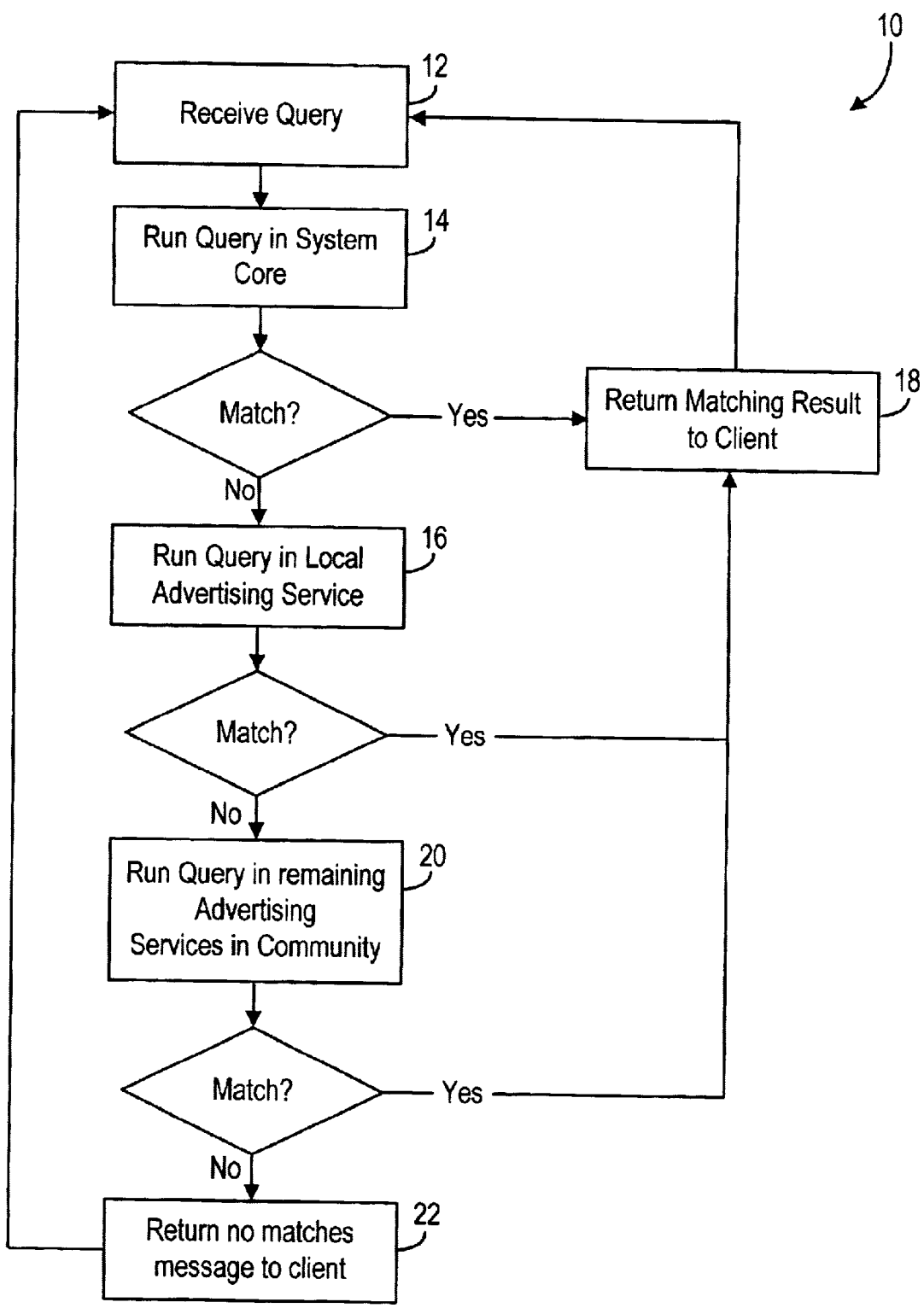
FIG. 10B illustrates, in a flowchart, one embodiment of a method for searching for a resource using a client-defined community.

FIG. 10B illustrates, in a flowchart, a method 10 of searching for resources within a community. In stage 12, the client sends a query to the client's system core. The query may include the attributes of a resource and a community in which to run the query. The system core runs the query against the system core's repository in stage 14. If a matching resource is found, a description or connection object of the matching resource is returned to the client in stage 18. If no match is found, the system core sends the query to the system core's advertising service to be run against the resources listed in the advertising service. Again, if a match is found, a description or connection object of the matching resource is returned to the client. If no match is found, the system core sends the query to the remote advertising services listed in the community. Descriptions or connection objects of any matching resources are returned to the client. If no matches are found in the remote advertising services of the community, a message so indicating is returned to the client in stage 22.

Figure 11:
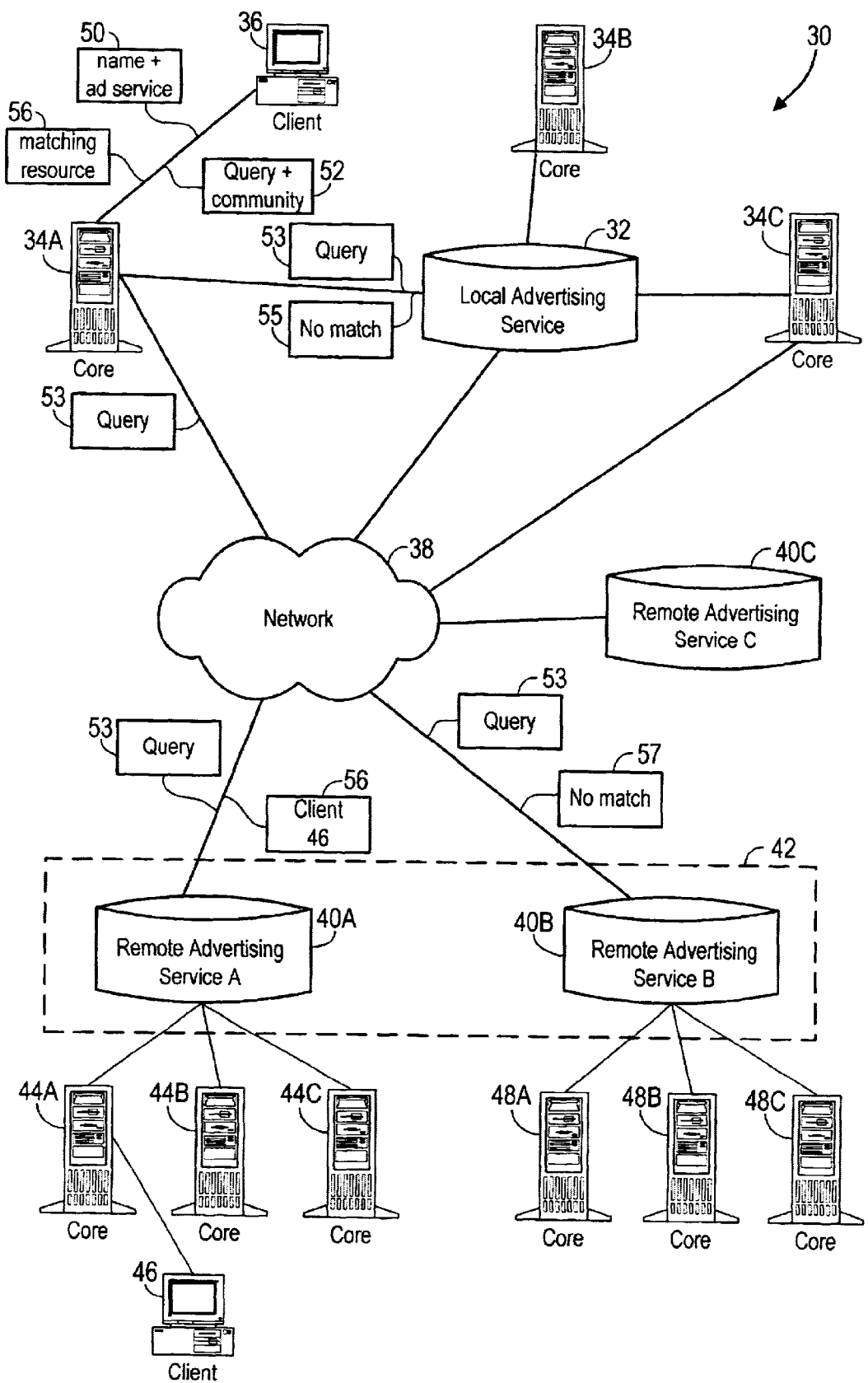
FIG. 11 illustrates one embodiment of a system for creating a client-defined community and searching for resources using the community.

FIG. 11 illustrates, in a system diagram, the messages exchanged between cores, advertising services, and clients in creating a community and searching for resources within that community. System 30 includes several advertising services 32, 40A, 40B, and 40C connected to a network 38. Each advertising service serves one or more cores. For example, advertising service 32 serves cores 34A, 34B, and 34C and advertising service 40B serves cores 48A, 48B, and 48C, etc.

In this example, client 36 is a client who is searching for a resource and client 46 is a client who is providing a resource matching client 36's search. Client 46 first registers its resource with core 44A, which in turn lists the resource with remote advertising service 40A, as described above. To search for the resource, client 36 first sends a message 50 to client 36's system core 34A. Message 50 includes the name of a new community to be defined, and the host names and port numbers of machines hosting the advertising services to be included in the new community. For example, message 50 may contain the host names and port numbers for advertising services 40A and 40B, thereby creating community 42. Client 36 discovers the host names and port numbers of the advertising services to be included in the community by searching for remote resources, as described above.

Client 36 then sends to core 34A a message 52, containing a query and the name of a community in which to run the query, e.g. community 42. Core 34A first runs the query against the resources listed in core 34A. If no match is found, core 34A removes the community information from the message sent from the client and sends query 53 to local advertising service 32, the advertising service serving core 34A. Query 53 is then run against the resources listed in advertising service 32, i.e. the resources listed on cores 34A, 34B and 34C. If no match is found, advertising service 32 returns message 55 to core 34A, indicating that no match has been found. Core 34A then sends query 53 to the remote advertising services listed in community 42, i.e. advertising services 40A and 40B. Each advertising service then runs the query against the resources listed on all the cores served by each advertising service. Advertising service 40B does not find a match to query 53, and therefore returns no match message 57. Advertising service 40A, however, find the resource listed by client 46, which matches query 53. Advertising service 40A returns to core 34A message 56, identifying client 46 as listing a resource matching query 53. Core 34A then forwards matching resource found message to client 36. Client 36 can then access the resource listed by client 46 as described above.

Once a community is defined, the client can subscribe to events within the community. In this manner, the client is notified of events that occur within the community. For example, in the baseball card community example described above, the client can be informed of particular new offerings such as a particular new baseball card appearing on the auction websites that are part of the baseball community.

Figure 12:
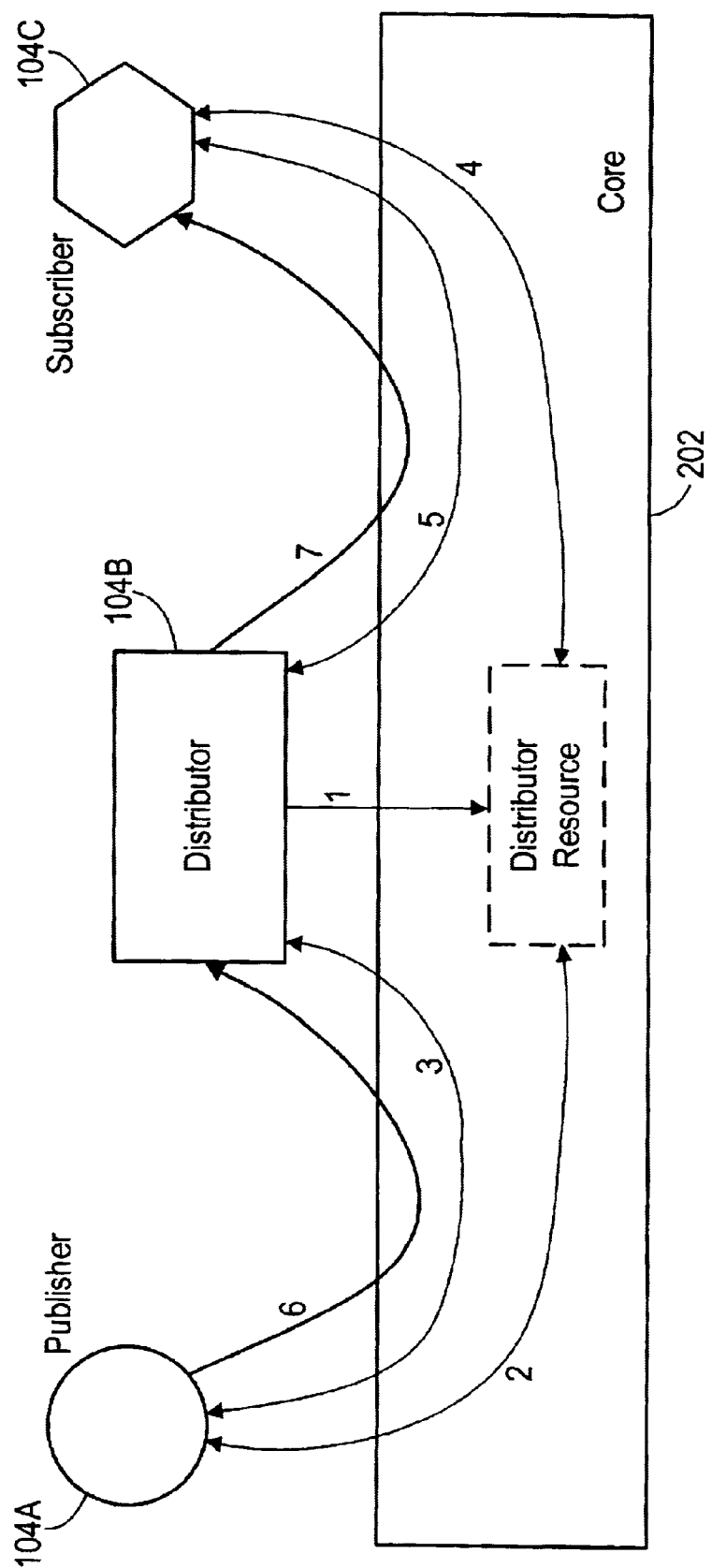
FIG. 12 illustrates one embodiment of a system for subscribing to events.

FIG. 12 illustrates a method of subscribing to and receiving notification of an event Publisher 104A is a client that generates an event notification message. Subscriber 104C is a client that registers interest in a particular event and receives notification of the event. Distributor 104B is a client that receives events and forwards them to subscribers. First, distributor 104B must register its distributing resource with core 202 in message 1. The attributes of the distributor's vocabulary indicate that it supports a distributor interface, i.e., that it distributes events. Event publisher 104A then discovers distributor 104B by performing an attribute-based search of core 202 in message 2. Message 3 is a publish request, send by publisher 104A to distributor 104B. Publish request 3 indicates publisher 104A's intent to send events to distributor 104B.

Subscriber 104C discovers distributor 104B by sending an attribute-based search message 4 to core 202. Subscriber 104C can limit the search to a particular community and thereby limit the type of events sent to subscriber 104C to only events within the relevant community. Subscriber 104C then sends a subscribe request to distributor 104B in message 5. Subscribe request 5 includes a description of the events in which subscriber 104C is interested.

Publisher 104A generates and sends an event to distributor 104B in notify message 6. Upon receiving an event from a publisher, the distributor looks up its list of active subscription. If the event received in notify message 6 matches subscribe request 5, the event received in notify message 6 is forwarded to subscriber 104C.

Various modifications and adaptations of the embodiments and implementations described herein are encompassed by the attached claims. The invention is not limited to the hardware or the software described herein. The cores described herein may be any suitable computer or personal electronic device. In addition, the resources described in this disclosure are not limited to the particular resources described herein. The embodiments described above are to be considered as illustrative only and not restrictive. The following claims rather than the foregoing description indicate the scope of the invention.

We claim:

1. A system for defining a search space, the system comprising:

a system core comprising one or more computers connected by a communication network;

a system core computer program executable by the system core, the system core computer program comprising computer instructions for:

receiving from a client a community name corresponding to a community;

receiving from the client an identification of an advertising service; and adding the advertising service to the community, wherein the community comprises at least one advertising service that is remote to the client, where the advertising service is configured to service at least one core that is associated with a second client that is remote to the client, where the core comprises a protection domain for managing the second client, and where the core checks if a requesting client can access a resource of the second client.

2. The system of claim 1 wherein the system core computer program further comprises computer instructions for setting the community as the client's default community.

3. The system of claim 1 wherein an identification of an advertising service comprises a host name and a port number corresponding to a machine hosting the advertising service.

4. The system of claim 1 wherein the advertising service is associated with a plurality of cores and lists a resource available from one of the associated cores.

5. The system of claim 1 wherein the system core computer program further comprises computer instructions for:

receiving a query from the client to be run in the community; and sending the query to each advertising service in the community.

6. The system of claim 5 wherein the query comprises an attribute of a resource.

7. The system of claim 5 wherein the system core computer program further comprises computer instructions for:

receiving from an advertising service in the community of an identification of a resource handler corresponding to a resource matching the query.

8. The system of claim 1 wherein the system core computer program further comprises computer instructions for:

receiving an event subscription request from the client; and sending the event subscription request to an event distributor resource.

9. The system of claim 8 wherein the event subscription request comprises a community name and an attribute of an event.

10. The system of claim 8 wherein the system core computer program further comprises computer instructions for:

receiving from the event distributor of an event matching the event subscription request.

11. A method for defining a search space in a system core comprising one or more computers connected by a communication network, the method comprising:

receiving, from a client, a community name corresponding to a community;

receiving, from the client, an identification of an advertising service; and adding the advertising service to the community, wherein the community comprises at least one advertising service that is remote to the client, where the advertising service is configured to service at least one core that is associated with a second client that is remote to the client, where the core comprises a protection domain for managing the second client, and where the core checks if a requesting client can access a resource of the second client.

12. The method of claim 11 further comprising:

setting the community as the client's default community.

13. The method of claim 11 wherein receiving an identification of an advertising service comprises receiving an identification of an advertising service comprises receiving a host name and a port number corresponding to a machine hosting the advertising service.

14. The method of claim 11 wherein the advertising service is associated with a plurality of cores and lists a resource available from one of the associated cores.

15. The method of claim 11 further comprising:

receiving a query to be run in the community; and sending the query to each advertising service in the community.

16. The method of claim 15 wherein receiving a query comprises receiving an attribute of a resource.

17. The method of claim 15 further comprising:

receiving an identification of a resource handler corresponding to a resource matching the query.

18. The method of claim 11 further comprising:

receiving an event subscription request from the client; and sending the event subscription request to an event distributor resource.

19. The method of claim 18 wherein receiving an event subscription request comprises receiving a community name and an attribute of an event.

20. The method of claim 18 further comprising:

receiving from the event distributor an event matching the event subscription request.

* * * * *

UNITED STATES PATENT AND TRADEMARK OFFICE
CERTIFICATE OF CORRECTION

PATENT NO. : 6,941,375 B1
APPLICATION NO. : 09/733025
DATED : September 6, 2005
INVENTOR(S) : Kannan Govindarajan et al.

It is certified that error appears in the above-identified patent and that said Letters Patent is hereby corrected as shown below:

On the face page, in field (54), in "Title", in column 1, line 1, delete "E-SERVICE" and insert -- 'E-SERVICES --, therefor.

In column 1, line 1, delete "E-SERVICE" and insert -- 'E-SERVICES --, therefor.

In column 14, line 34, in Claim 2, after "for" insert -- : --.

In column 15, lines 23-24, in Claim 13, after "service comprises" delete "receiving an identification of an advertising service comprises".

Signed and Sealed this

Fourth Day of May, 2010

David J. Kappos
*Director of the United States Patent and Trademark Office*